May 15, 1928.
W. D. EAKIN
1,669,698
PRECISION ADJUSTMENT DEVICE
Original Filed Oct. 25, 1922
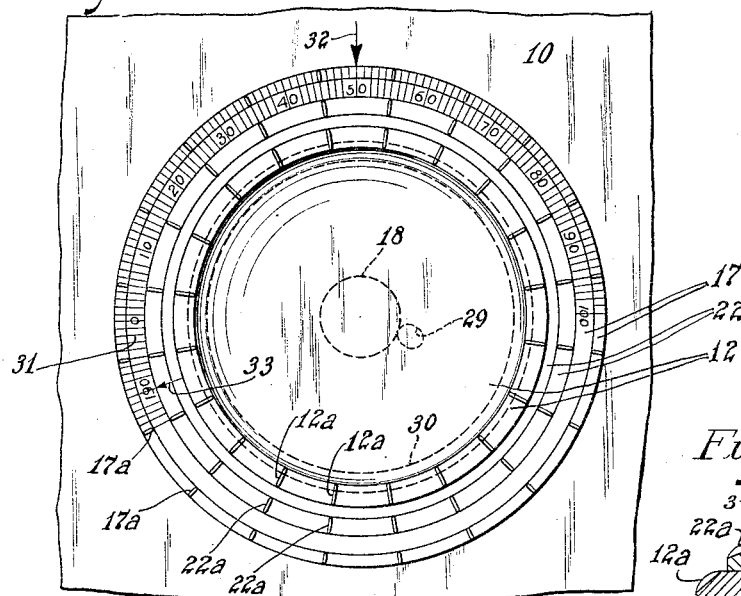
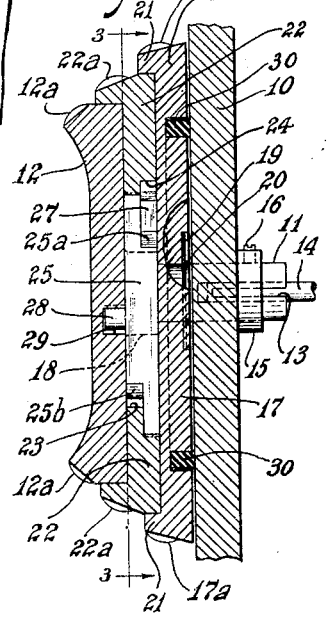
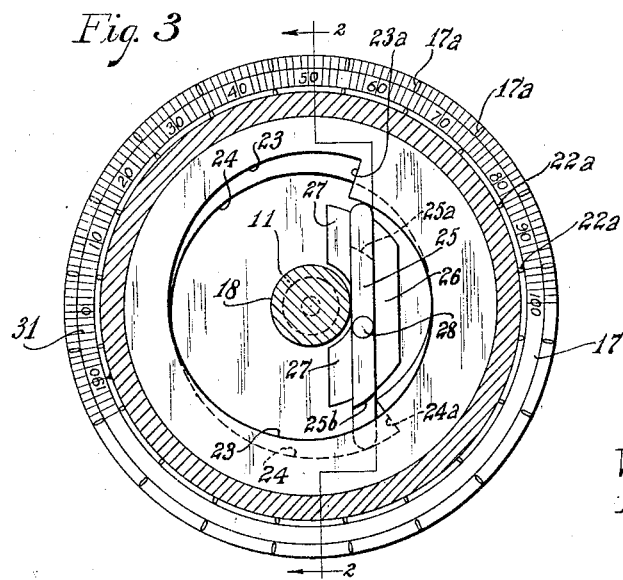
Inventor
Willard D. Eakin.
By Robert M. Pierson
Atty.

Patented May 15, 1928.

1,669,698

UNITED STATES PATENT OFFICE.

WILLARD D. EAKIN, OF HUDSON, OHIO, ASSIGNOR TO THE B. F. GOODRICH COMPANY, OF NEW YORK, N. Y., A CORPORATION OF NEW YORK.

PRECISION-ADJUSTMENT DEVICE.

Application filed October 25, 1922, Serial No. 596,905. Renewed March 21, 1928.

This invention relates to precision adjustment devices and is especially applicable to devices adapted for precise angular adjustment of parts of sensitive instruments such as the tuning devices of radio-telephone sets.

Its chief objects are to provide an improved device, of simple construction, whereby extremely fine adjustment of parts may be had and in which the adjusted member is automatically secured in adjusted position; in the designing of which intricate calculations may be avoided; the parts of which may be conveniently formed, as by molding them of plastic material such as a hard-rubber compound; and in which all parts may be of such simple form as to provide strength in conjunction with delicacy of adjustment. A further object is to provide a self-contained device of such compact construction as to combine strength with economy of material. A further object, with respect to embodiments such as that shown in the accompanying drawings, having a main dial member and an auxiliary dial member adapted respectively to drive the adjusted member at different relative speeds, is to provide, with a minimum number of parts, a limited range of angular adjustment of the auxiliary dial member with relation to the main dial member, so that the former cannot be turned through more than one revolution with relation to the latter and uncertainty thus introduced as to the significance of the dial readings. Still another object is to provide for a decrease of the speed of the adjusted part with relation to its driving member as it approaches the exact setting desired.

Of the accompanying drawings:

Fig. 1 is a front elevation of a part of a radio instrument board and, mounted thereon, a precision adjustment device embodying a preferred form of my invention.

Fig. 2 is a vertical section of the same, on the broken line 2—2 of Fig. 3, with a part broken away.

Fig. 3 is a vertical section thereof, on line 3—3 of Fig. 2.

Referring to the drawings, 10 is the instrument board, formed with an aperture through which projects, from the front side of the board, the clamping stem 11 of a knob-member 12, said stem being bored, and slotted as indicated at 13, to receive the end portion of a shaft 14, such as commonly extends from the rotor of a variometer and requires to be angularly adjusted. Said shaft is clamped in the stem 11 by a collar 15 mounted on the latter and a set-screw 16 threaded through said collar (Fig. 2). Said collar abuts the rear face of the board 10, to retain the device in assembled relation with said board.

Journaled upon the stem 11 adjacent the board 10 is a main dial member 17, against the front face of which rotatably abuts the shoulder of an enlarged base portion 18 of the stem 11, and the rear face of said main dial member is concentrically recessed to accommodate a retaining washer 19 and a spring clip 20 mounted on the stem 11 and adapted to retain the principal parts of the device in assembled relation when they are removed from the instrument board, said spring clip fitting in a circumferential groove in said stem.

The main dial member 17 is formed with a forwardly projecting flange 21 about its circumference, within which is rotatably fitted an annular, auxiliary dial member 22 surrounding the base portion of the stem 11, and retained in its seat by the knob-member 12.

Said auxiliary dial member is formed on its inner periphery with a pair of oppositely pitched, volute, cam surfaces 23, 24 adapted to engage the respective ends of a push-bar or cam-follower 25 slidably mounted between raised guides 26, 27, 27, formed on the front face of the main dial member 17. Said cam surfaces are preferably off-set from each other in an axial direction, so that the range of the auxiliary dial member need not be unduly limited, and the latter is formed with a shoulder, $23^a$ or $24^a$, at a terminus of each of the cam surfaces, said shoulder connecting the respective ends of each cam surface in the form of device here shown, and being adapted to strike the side of the push-bar 25 to limit the range of the auxiliary dial member, as clearly shown as to the shoulder $24^a$ in Fig. 3. When the cam surfaces are axially off-set from each other, as here shown, the push bar 25 is cut away at its rear side at one end, as shown at $25^a$, to clear the rear cam, 24, while engaging the front cam, 23, and at the other end is cut away at its front side, as shown at $25^b$, to clear the front cam, 23, while engaging the rear cam, 24.

The front side of the push-bar 25 is formed with a circular stud 28 slidably and rotatably mounted in a radial groove 29 formed in the rear face of the knob-member 12, said knob member thereby being adapted to be turned with relation to the main dial member 17 by the sliding movement of said push-bar, between its guides 26, 27, under action of the cam surfaces 23, 24, the stud 28 acting as a crank-pin. Said cam surfaces are preferably so formed that they will, with a minimum of tolerance or play, engage the respective ends of the push-bar at all positions of the auxiliary dial member, although cam surfaces of simple spiral form may be used, even when the push-bar is off-set from the center of the device as here shown, without necessitating a very great tolerance between said surfaces and the push-bar.

For securing the main dial member 17 in adjusted positions a brake, here shown as a soft rubber ring 30, is mounted in the rear side of said member and adapted to bear against the instrument board 10, this form of brake being adapted to avoid cramping the stem 11 in the aperture of the instrument board or mis-aligning the shaft 14, as distinguished from a brake acting with greater force at one side of the stem 11 than at the other. The rubber ring 30 is preferably formed of slightly smaller circumferential length than the groove it is to occupy, and stretched into the latter, so that its elasticity retains it therein when the device is removed from the instrument board.

The exposed surface of the main dial member 17 is provided with a scale 31, and indicators 32, 33 are marked on the instrument board 10 and the auxiliary dial member 22 respectively and adapted to register on said scale. Both dial members, 17, 22, and the knob member 12, are formed with wings 17ª, 17ª, 22ª, 22ª and 12ª, 12ª, respectively on their outer peripheries, to facilitate turning them.

In the operation of the device, the parts being assembled as shown clearly in Fig. 2, but preferably with the auxiliary dial member at a position mid-way of its range, the entire device, including of course the shaft 14, is first turned to approximately the setting desired, and this may be accomplished by manually turning either the main dial member 17 or the knob-member 12, the construction as above described being such that the two said members are interlocked against relative movement except as to forces applied thereto through the auxiliary dial member 22, since such relative movement calls for a sliding of the push-bar 25 between its guides and such sliding movement of the push-bar is prevented by the cam surface 23 or 24 against which the push-bar bears at its respective ends.

An approximate adjustment being thus obtained, the auxiliary dial member 22 is then turned with relation to the main dial member, the latter being held in position by the brake 30, for finer adjustment of the knob-member 12 and with it the shaft 14, the cam surface 23 or 24, depending upon which way the auxiliary dial member is turned, driving the push-bar 25 and turning the knob-member 12 at a very slow relative speed and with a progressively slower relative speed as the stud 28 moves outward in its slot 29, the speed ratio increasing not only because of the increasing radius from the center of the knob to the stud but because the movement of the stud becomes increasingly oblique to said radius. By so setting the main dial member that the final adjustment is to be had near the limit of the auxiliary dial member's range of movement, extremely fine adjustment may be had even though the cam surfaces 23, 24 be of relatively high pitch. I do not wholly limit my claims, however, to apparatus in which this variable speed ratio is present and uncompensated.

The cam surfaces 23, 24 may readily be designed, as by mechanically platting them, and by giving them a low pitch the speed ratio between the auxiliary dial member and the member to be adjusted may be increased to a value approaching infinity without any other change in the device and without such weakening of parts as would be necessary to accomplish the same result in a gear-driven device, for example, where the number of cogs would require to be greatly increased and their size correspondingly reduced, if the size of the device were to be kept within reasonable limits. These advantages are present also in conjunction with a positive drive, which latter has obvious advantages over a frictionally-driven device. The main dial member being interlocked with the knob member except as to forces applied through the auxiliary dial member, the brake 30 effectively holds said knob member in adjusted position.

All of the major parts of the device, being of simple form, are adapted to be conveniently molded. The simple and compact structure of the device provides great strength with a minimum of material. All parts of the driving connection between the shaft 14 and the auxiliary dial member lie within the circumference of the latter, which is to say within its area projected in an axial direction, wherefore the device is self-contained, substantially all of its mechanism being enclosed. The knob member 12 constitutes in effect a crank, which, by reason of the slot 29 is of variable radius, and the walls of said slot constitute cam surfaces adapted to be engaged by the stud 28 in sliding contact, whereby a speed reduction may be had in addition to that incident to the cam surfaces 23, 24.

Various modifications may be resorted to within the scope of my invention, and I do not wholly limit my claims to the specific construction shown.

I claim:

1. A precision adjustment device comprising a part to be angularly adjusted, a cam member journaled coaxially with relation thereto and formed with a pair of volute, oppositely pitched, inwardly facing, cam surfaces running at right angles to the axis of said part, a cam follower interposed between said cam surfaces and adapted to be actuated oppositely by them respectively as said cam member is oscillated, and means connecting said cam follower with said part for driving the latter.

2. A precision adjustment device comprising a part to be angularly adjusted, a crank structure thereon formed with a radially disposed recess, a cam follower formed with a stud, said stud being mounted in said recess, a mounting for said cam follower, and a rotatable member provided with a cam surface adapted to actuate said cam follower.

3. A precision adjustment device comprising a part to be angularly adjusted, a slide-bar operatively connected with and adapted to drive said part, a mounting for said slide-bar, and a rotatable member surrounding said part and provided with a cam surface adapted to drive said slide-bar, all driving connections between said part and said rotatable member being wholly within the axially projected area of the latter.

4. A precision adjustment device comprising a part to be adjusted, an annular member journaled adjacent said part and provided with a pair of oppositely pitched, volute, circumferentially overlapping cam surfaces axially offset from each other, a cam follower support, a cam follower mounted thereon within said annular member and provided with oppositely disposed, off-set faces each adapted to engage one of said cam surfaces while clearing the other, said cam surfaces being so formed as to continue approximately in contact with the respective faces of said cam follower as said annular member is turned, and said cam follower being operatively connected with and adapted to drive said part.

5. A precision adjustment device comprising a part to be adjusted, an annular member journaled adjacent said part and provided with a cam surface receding from its axis, a slide-bar mounting, and a slide-bar mounted thereon within said annular member and adapted to drive said part, said cam surface being adapted to drive said slide-bar by contact with a transverse face thereof, and said annular member being provided, at a terminus of said cam surface, with a stop face adapted to contact a side face of said slide-bar to limit the turning of said annular member.

6. A precision adjustment device comprising a part to be angularly adjusted, a main dial member journaled concentrically with relation thereto, means for securing said main dial member in different angular positions, an auxiliary dial member rotatably mounted on said main dial member, and means including a cam for driving said part with relation to said main dial member when said auxiliary dial member is turned.

7. A precision adjustment device comprising a part to be angularly adjusted, a main dial member journaled concentrically with relation to said part, means for securing said main dial member in different angular positions, an auxiliary dial member journaled on said main dial member, surrounding said part, and internally formed with a cam surface receding from its axis, and a cam follower mounted on said main dial member within said auxiliary dial member and adapted to be actuated by the cam surface of the latter, said cam follower being operatively connected with and adapted, under action of said cam surface, to drive said part with relation to said main dial member as said auxiliary dial member is turned.

8. A precision adjustment device comprising a part to be angularly adjusted, a main dial member journaled concentrically with relation to said part, means for securing said main dial member in different angular positions, an annular, auxiliary dial member journaled on said main dial member and internally provided with a pair of oppositely pitched cam surfaces receding from its axis, and a cam follower mounted on said main dial member within said auxiliary dial member, opposite faces of said cam follower being adapted to be engaged by said cam surfaces respectively, and said cam follower being operatively connected with and adapted to drive said part with relation to said main dial member as said auxiliary dial member is turned.

9. A precision adjustment device comprising a part to be angularly adjusted, a main dial member journaled concentrically with relation thereto, an auxiliary dial member journaled on said main dial member, and means operatively connecting said auxiliary dial member with said part and adapted to drive the latter with relation to said main dial member, and with a determinately varying speed ratio, when said auxiliary dial member is turned.

10. In radio apparatus, in combination with an instrument board and a shaft positioned at right angles thereto and requiring to be angularly adjusted, a precision adjustment device for said shaft comprising a knob member secured to said shaft, the head of said knob member being formed on its rear face with a radial groove; a main dial member coaxially journaled with relation to said knob member; a brake interposed between said main dial member and said board; an annular, auxiliary dial member coaxial with relation to said knob-member, between the head thereof and said main dial member, and internally formed with a cam surface receding from its axis; and a cam follower mounted on said main dial member within said auxiliary dial member, adapted to be actuated by said cam surface, and formed with a stud, said stud being mounted in the groove of said knob-member.

In witness whereof I have hereunto set my hand this 21 day of October, 1922.

WILLARD D. EAKIN.